Nov. 14, 1939.                A. L. JOHNSON                 2,180,210
                        ADJUSTABLE SUPPORTING MEANS
                        Filed Nov. 3, 1937        2 Sheets-Sheet 1
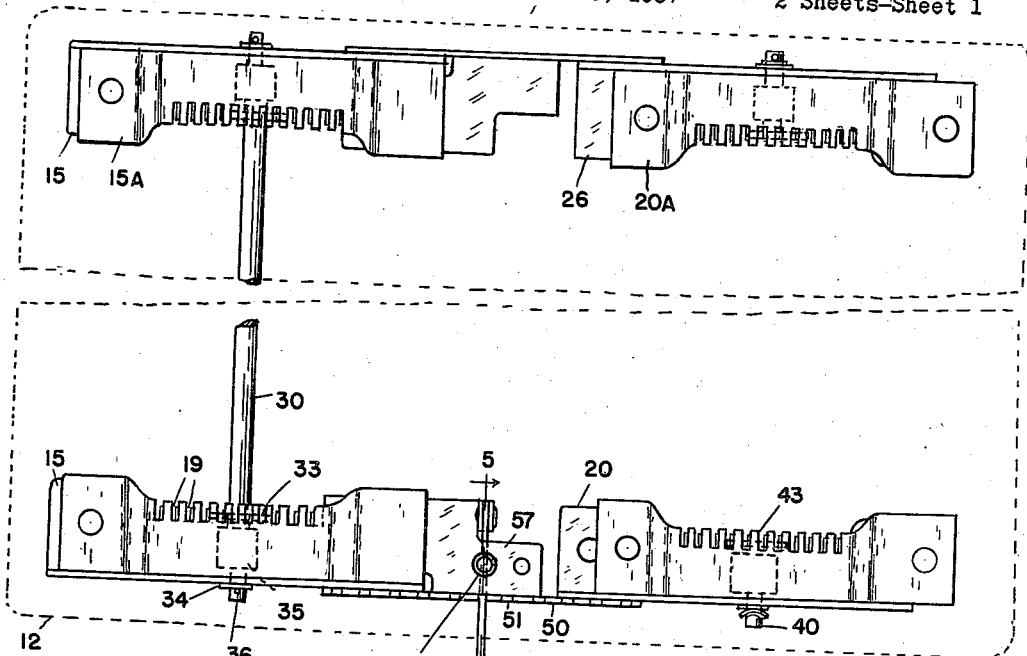
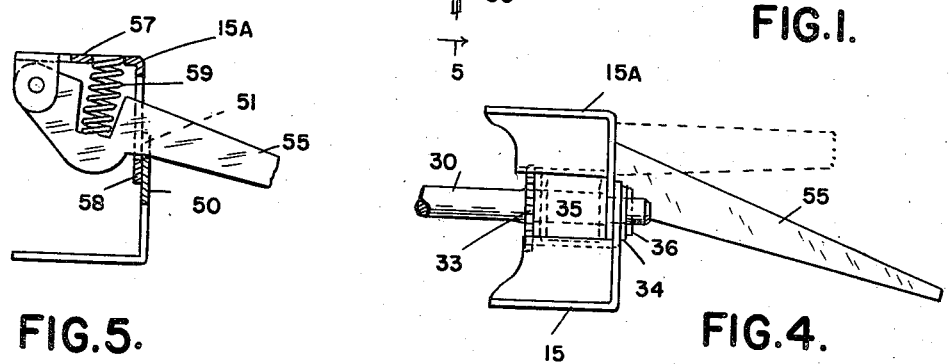
FIG.5.                              FIG.4.
FIG.6.                              FIG.7.
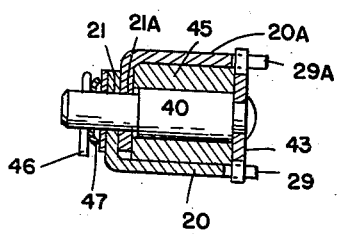  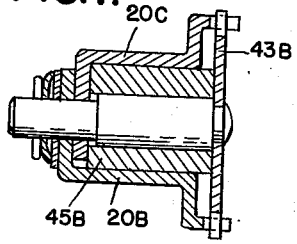
INVENTOR.
ANDREW L. JOHNSON
BY
ATTORNEYS

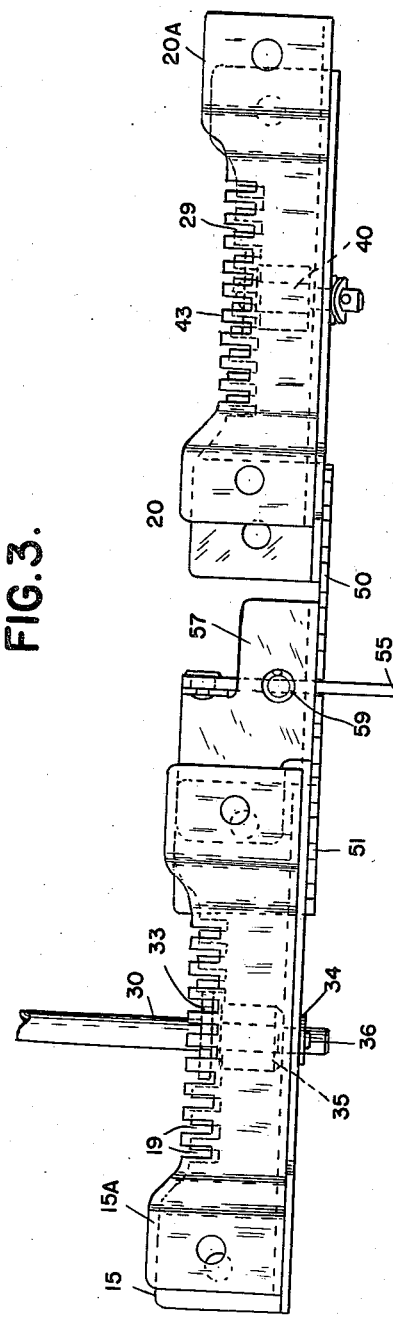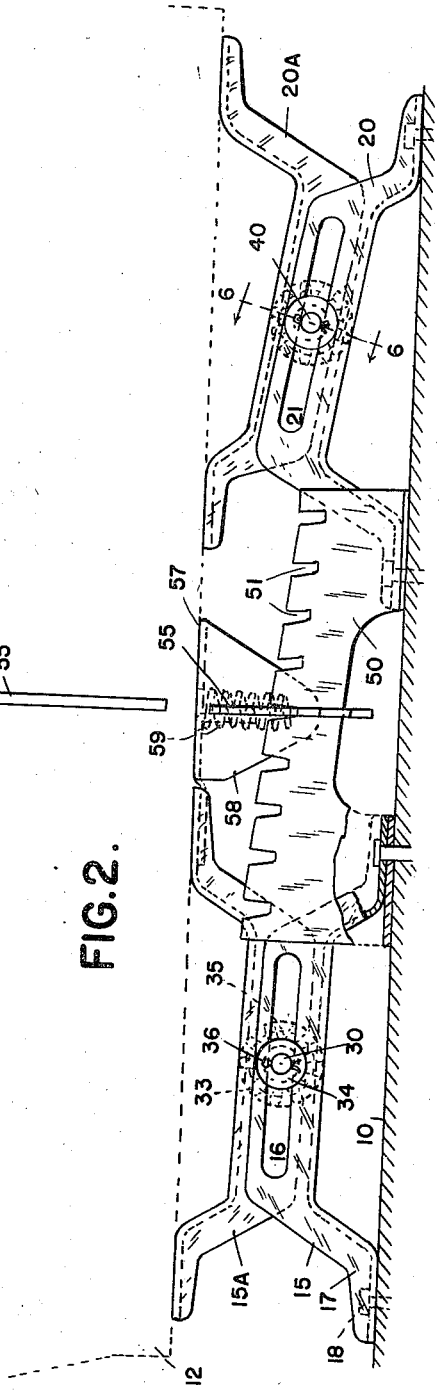

Patented Nov. 14, 1939

2,180,210

UNITED STATES PATENT OFFICE 2,180,210

ADJUSTABLE SUPPORTING MEANS

Andrew L. Johnson, Detroit, Mich., assignor to The American Forging & Socket Company, Pontiac, Mich., a corporation of Michigan Application November 3, 1937, Serial No. 172,593

3 Claims. (Cl. 155—14)

This invention relates to improved adjustable supporting means for seats and the like, and is particularly concerned with improvement and simplification of adjustable supporting means for the seats of vehicles.

An important object of the invention is to provide in such a support an improved track and carriage assembly, the track section adapted for securance to a floor and the carriage section being rollable thereover and directly carrying the seat, the parts being so designed that such track and carriage portions comprise identical stampings of simple form, between which rollers having ample bearing surfaces may be interposed.

A further object is to incorporate in such a construction improved means for preventing lateral movement and rattling of the carriage and its supported seat, together with guide means controlling the relative movement of the track and carriage portions.

A further object is to provide track and carriage portions for supporting a seat in the manner indicated, formed in a plurality of separate sections so inclined with respect to each other that rocking movement of the seat about a transverse axis may be caused during its adjustment, for tilting the seat to and fixing it in different desired angular positions.

A further object is to provide improved locking means for releasably holding against movement the carriage portion and so a seat supported thereby.

Other objects and advantages will be apparent from the following description wherein reference is made to the accompanying drawings illustrating a preferred embodiment of my invention and wherein similar reference numerals designate similar parts throughout the several views.

In the drawings:

Figure 1 is a plan view of a seat supporting assembly incorporating the principles of this invention, the synchronizing shaft being centrally broken away.

Figure 2 is a side elevational view of one of the assemblies constituting such seat supporting means, showing the latch construction.

Figure 3 is an enlarged plan view of such assembly.

Figure 4 is a front elevational view thereof.

Figure 5 is a cross section taken substantially on the line 5—5 of Figure 1 and looking in the direction of the arrows.

Figure 6 is a cross section taken substantially on the line 6—6 of Figure 2 and looking in the direction of the arrows.

Figure 7 is a cross sectional view similar to Figure 6 showing a somewhat modified construction.

Referring now to the drawings, reference character 10 designates a floor, with respect to which the supported seat 12 is desired to be movable forwardly and rearwardly. It will be understood that the track portions 15—20, are secured to the floor, and the carriage portions 15A—20A are secured to the under-side of the seat, one complete track and carriage assembly being provided at the front and another at the back at each end of the seat. The supporting means at each end of the seat may be alike but symmetrically opposite. A description of the supporting means at one end of the seat will therefore suffice, together with the synchronizing means for insuring uniform movement of both ends of the seat, and the locking means, which is provided at one end only.

Although in the shown construction separate track sections are provided at the front and back, designated 15, 20, respectively, they, and their corresponding front and rear carriage sections 15A, 20A could of course be of unitary construction. The forward track section, comprising a single sheet metal stamping, is formed with spaced feet 17, through which bolts 18 may be passed to secure it to the floor, and a raised central portion of right-angular section and which comprises a horizontal bottom web of substantial width and a vertical outer web. The inner edge of the horizontal web is serially notched as at 19 to provide rack teeth, and the vertical web is provided with a longitudinal slot 16.

The rear track member 20 will be seen to be of similar construction, save that its central section inclines upwardly toward the front, the guide slot 21 therein being similarly inclined.

Each carriage element is identical with its corresponding track element, but inverted and reversed in position, their vertical flanges being in slidable engagement with each other. Referring to the front assembly, it will be seen that the horizontal track and carriage flanges overlie one another, while the slot portions 16—16A in their vertical flanges are aligned, allowing free extension of the roller and synchronizing shaft 30 therethrough. It will be seen that the several parts of each carriage member which correspond to parts of its cooperating track member are designated by like reference characters distinguished by the addition of the letter A. The serrated rack-forming notches 19 of the front assembly also overlie one another and mesh with a gear 33 fast upon the synchronizing shaft. As previously stated, the shaft projects through the aligned slots 16, in the vertical flanges, a roller 35 being mounted upon the shaft between the horizontal flanges to take the vertical load. A washer and cotter pin 34—36 may be employed to lock the shaft in place.

Rack-defining notches 29 are also cut in the inner edges of the rear track and carriage elements, and rollable between and meshing with such rack portions is a stamped sheet metal gear 43, mounted upon a stub shaft 40 tending to draw its head inwardly, thus urging the gear and roller toward the vertical flange of the carriage element, as well as providing frictional engagement between the track and carriage elements themselves and preventing rattling of all parts of the assembly. Proper registry of the slots and identical inclination of the bracket-like track and carriage portions is secured by merely reversing and inverting one element with relation to the other, similarly to the arrangement of the front elements.

The locking means for preventing unwanted movement of the seat comprises a flanged plate 50 secured to the floor 10 and having a series of notches 51 in its top, and a sheet metal locking lever 55 secured to the seat and vertically swingable into and out of engagement with the notches in the plate. The lever is pivoted upon a bracket 57 secured to the underside of the seat frame and provided with a downbent flange 58 slotted to allow vertical movement of the lever and lying beside the notched plate 50. The slotted flange 58 prevents the imposition of undue bending stresses upon the lever. A compression spring 59 urges the lever downwardly into engagement with the notches, the spring being trapped between the lever and the top flange of the bracket 57 and housed in suitably positioned openings in these elements, as best shown in Figure 5.

The lever projects laterally from the seat in such position that it may be conveniently raised by an occupant thereof to free the seat for sliding movement.

What I claim is:

1. Supporting means for a seat or the like comprising track and carriage elements, one adapted to be secured to a floor and the other to a supported object, each of said elements being of substantially right angular cross section, one flange of each element being substantially vertical, said vertical flanges being in slidably overlapping relation and having aligned guide slots therein, the other flanges of said elements extending in a common direction from the vertical flanges in spaced substantially parallel relation to each other, a series of rack-forming portions carried by each of said angularly projecting flanges near its free edge, a shaft portion projecting between said angularly projecting flanges and through said aligned guide slots, a roller portion mounted upon said shaft portion between said angularly projecting flanges and imposing the load of said carriage portion thereupon, a gear portion also carried by the shaft upon the opposite side of said roller portion from said overlapping flanges, and abutment means carried by said shaft outside said flanges and gear portion and preventing separation of said overlapping flanges, roller and gear portions.

2. Supporting means for a seat or the like comprising track and carriage elements, one adapted to be secured to a floor and the other to a supported object, each of said elements being of substantially right angular cross section, one flange of each element being substantially vertical, said vertical flanges being in slidably overlapping relation and having aligned guide slots therein, the other flanges of said elements extending substantially in a common direction from the vertical flanges, and in spaced parallel relation to each other, a series of rack-forming portions carried by each of said angularly projecting flanges near the free edge thereof, a shaft portion projecting between said angularly projecting flanges and through said aligned guide slots, a roller portion mounted upon said shaft portion between said angularly projecting flanges and imposing the load of said carriage portion thereupon, a gear portion also carried by the shaft and meshing with the rack-forming portions, said angularly projecting flanges being spaced from the support and seat, the roller portion being located between the gear portion and said vertical flanges, and an abutment carried by the shaft and locating the gear and roller portions.

3. Supporting means for a seat or the like comprising track and carriage elements, one adapted to be secured to a floor and the other to a supported object, each of said elements being of substantially right angular cross section, one flange of each element being substantially vertical, said vertical flanges being in slidably overlapping relation and having aligned guide slots therein, the other flanges of said elements extending substantially in a common direction from the vertical flanges, and in spaced parallel relation to each other, a series of rack-forming portions carried by each of said angularly projecting flanges near the free edge thereof, a shaft portion projecting between said angularly projecting flanges and through said aligned guide slots, a roller portion mounted upon said shaft portion between said angularly projecting flanges and imposing the load of said carriage portion thereupon, a gear portion also carried by the shaft and meshing with the rack-forming portions, the roller portion being located between the gear portion and said vertical flanges, an abutment carried by the shaft on the opposite side of the gear portion from said roller portion, and another abutment carried by the portion of the shaft which projects through said slots, whereby said vertical flanges are maintained in slidable engagement.

ANDREW L. JOHNSON.